Feb. 5, 1935. J. TAYLOR 1,989,718
BATTERY CABLE
Filed Nov. 13, 1930 2 Sheets-Sheet 2

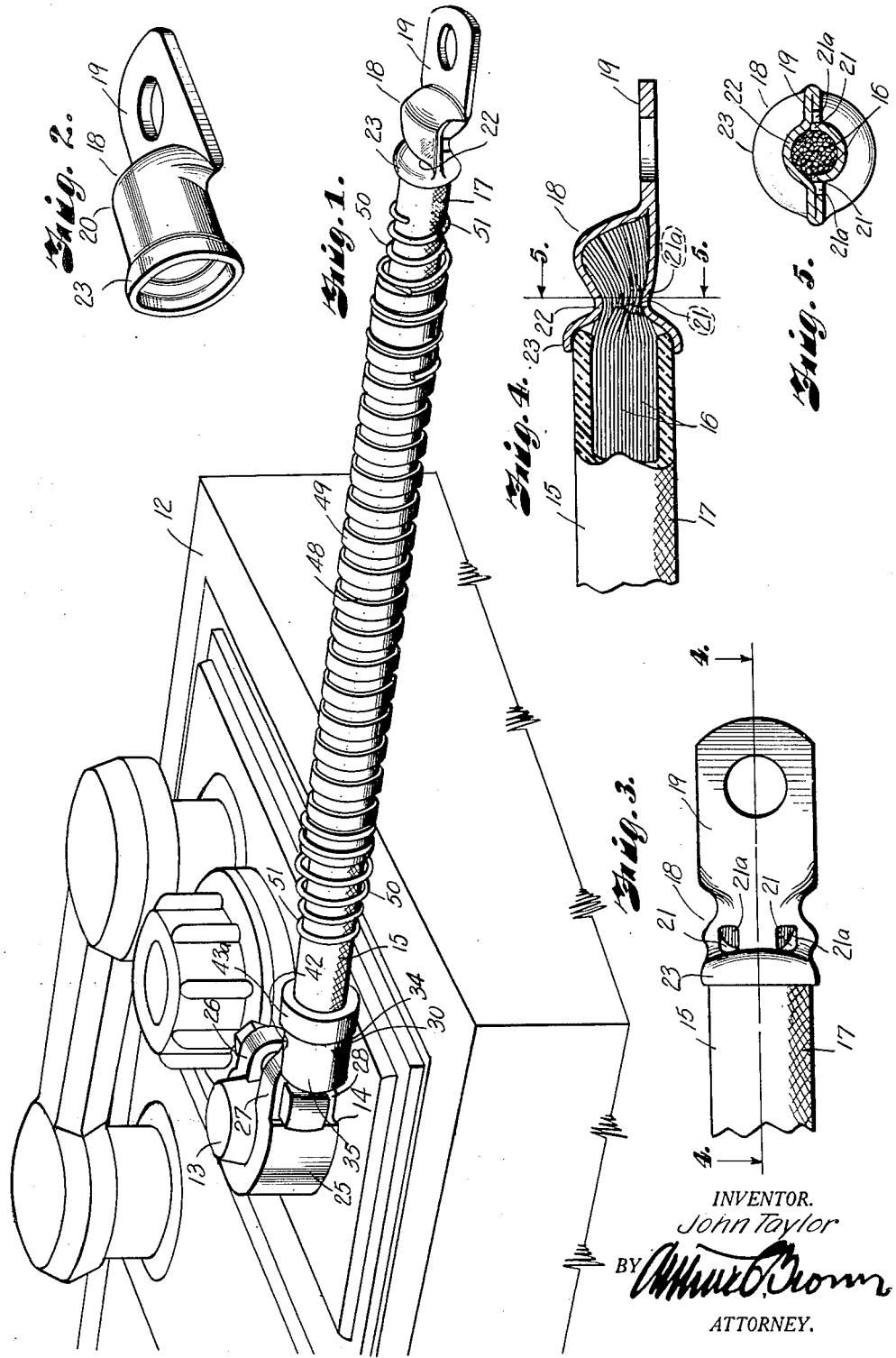

INVENTOR.
John Taylor
BY Arthur C. Brown
ATTORNEY.

Patented Feb. 5, 1935

1,989,718

UNITED STATES PATENT OFFICE 1,989,718

BATTERY CABLE

John Taylor, Kansas City, Mo., assignor to Mayme C. Taylor, Kansas City, Mo.

Application November 13, 1930, Serial No. 495,388

11 Claims. (Cl. 173—267)

This invention relates to battery cables and like devices including one or more terminals secured to a strand member such as a bundle of conductive wire, and a method of forming the terminals on the cable. Corrosion due to access of acids and the like to the cable and joints of the cable with the terminals tends to deteriorate ordinary cable rapidly, and the joints tend to become dislodged under use. These and other causes result in reducing the conductive qualities of cables, thus requiring frequent repair or replacement. The principal objects of the invention are to enhance the security of attachment of a terminal to a strand member, and to assure relatively permanent and highly efficient conductive engagement between terminals and strand members. A further object is to protect conductors from deterioration due to use thereof.—

Other important features and objects of the invention will be apparent as the description proceeds.

In the accompanying drawings:

Fig. 1 is a perspective view of a portion of a battery and a cable attached thereto embodying my invention.

Fig. 2 is a perspective view of a terminal prior to mounting on a strand member and having one end adapted for attachment to a contact post.

Fig. 3 is a plan view of the terminal shown in Fig. 2, and adjacent portion of a cable to which it is attached.

Fig. 4 is a section on the line 4—4, Fig. 3.

Fig. 5 is a section on the line 5—5, Fig. 4.

Fig. 6 is a perspective view of one end of a cable having a terminal adapted to be mounted on a battery post.

Fig. 7 is a plan view of the cable end portion shown in Fig. 6, the terminal and adjacent portion of the strand member being shown in section.

Fig. 8 is a bottom plan view of the terminal shown in Figs. 6 and 7 prior to attachment thereof to a strand member.

Fig. 9 is a section on the line 9—9, Fig. 7.

Fig. 10 is a section on the line 10—10, Fig. 8.

Referring in detail to the drawings:

12 designates a battery having a post 13 to receive a terminal 14 of a cable 15, comprising a bundle of strands 16 of highly conductive wire, and an insulating cover 17 of rubber or the like.

A terminal 18 mounted on the opposite end of the cable is provided with a flattened end portion 19 perforated for mounting the same over a binding post or contact not shown. Conductors, for example similar cables, may then be attached to such a post, for completing the circuit.

The terminal 18 further comprises a portion 20, Fig. 2, which is tubular and symmetrical before installation of a cable end therein, having an open outer end and forming a socket to receive the end portion of the cable which has been stripped of insulation. The socket is sufficiently long to accommodate a substantial amount of the strand bundle ends, whereby tongues 21 and 22 may be instruck or impressed from the body of the tubular portion to press against the cable or pass among the strands to lock the cable in the terminal as shown in Fig. 4. The tongues 21 comprise instruck pin-like prongs, the formation of which produces openings 21ª in the tubular body, as shown in Fig. 3.

Attention is called to the inward forward inclination of the tongues 21 toward the end wall of the socket in Figs. 3 and 4, whereby the strands are pressed toward said end wall.

The tongue 22 comprises a transverse indentation in the upper periphery of the tubular body to produce an internal rib and assist in binding the cable to the terminal. The tongue 22 may include portions depressed below the main extent of the transverse indentation.

The outer open end of the tubular portion 20 of the terminal 18 has an annular enlarged flange 23 adapted to surround the end of the cutaway insulation as shown in Fig. 5, and form a stop or annular seat to receive the end edge of the insulation.

Attention is called to the tangential relation of the flat end 19 of the terminal 18 to the tubular portion 20, as clearly indicated in Figs. 2 and 4, whereby the tubular portion projects above the flat end and the cable may lie substantially straight on a surface whereon the terminal is mounted.

Depression of portions of the tubular body into a cable end to form the retaining prongs and ribs produces a pocket-like recess at the closed end of the socket as shown in Fig. 4, wherein the ends of the cable strands are tightly compressed and held in close engagement and effective conductive contact with the inner surfaces of the terminal.

The terminal 14 includes a connector clamp or hook portion including an arcuate body 25 forming a split ring slidable over the post 13 and having normally parallel ears 26 and 27 apertured to receive a bolt for securing the terminal to the post.

The ear 27 has a flat face 28 to receive the head of the bolt. A tubular barrel or socket member 30 having a cylindrical bore or socket recess extends from the ear 27 in angular relation with the plane of said face 28, to allow the terminal to be fitted on the battery post in such a manner that the bolt will not encounter the vent cap or like portions of the battery, and the cable will clear battery members such as handles. The extended axis of the socket diverges from the face 28 of the ear 27 as clearly shown in Fig. 7. The bottom 31 of the socket and the outer surface of the end wall 32 closing the socket are in planes parallel with the axis of the split ring 25.

The terminal comprises a casting including the socket 30 which is originally in the form shown in Figs. 8 and 10, comprising parallel side walls or wings 33 and 34 and a connecting web or wall 35, thus having U-shaped cross section. The wing 33 is integral with the ear 27 and projects above the upper edge of the ear as suggested in Fig. 8. As clearly shown in Fig. 6, the socket lies on the plane of the lower edge of the clamp.

Ribs 36 and 37 integral with the side wings and connected by an arcuate rib 38 following the contour of the semi-cylindrical wall of the socket, project inwardly in alignment at right angles to the wings, at approximately the midpoint of the socket, but preferably spaced slightly from the midpoint toward the outer open end of the socket. The outer ends of the ribs 36 and 37 are beveled to permit snug end abutment when the wings are bent over to form a cylindrical socket.

Located approximately centrally in the longitudinal edges of the wings 33 and 34 as shown in Fig. 8, are notches 40 adapted to register when the said walls are bent to confer tubular character on the socket and produce a port designated 40ª in Fig. 9. The notches taper to render the port 40ª circular in cross section and having inwardly increasing diameter.

The end wall 32, in the original casting, is connected to the ear 27 and wing 34 over opposite segmental portions of its periphery, the upper edge portion of the wall 32 being convexly arcuate in the casting as indicated in Fig. 8, and thus adapted to receive the inwardly bent over wings to effect circular formation thereof, as indicated in dotted lines in Fig. 10.

An aperture 42 is provided in the casting centrally in the arcuate wall 35 adjacent the curved rib 38, and substantially in a circle including the notches 40, and thus opposite the port 40ª when the terminal is formed as later described.

The outer end portions of the wings exterior to the ribs, designated 43 in Fig. 8, and the connecting web 35, are slightly enlarged and may have inner and outer surfaces offset outwardly from the corresponding surfaces of the portions of the wings and walls on the opposite side of the ribs to provide a collar-like socket portion designated 43ª in Figs. 6, 7 and 9 to accommodate the end portion of the cutback insulation as best shown in Figs. 7 and 9.

A pin or tongue 44 having a relatively wide base and tapering to a sharp point radiates inwardly from the curved wall 35 adjacent the aperture 42, and between said aperture and the end wall 32, being thus spaced substantially and a maximum distance from said end wall, as shown in Figs. 8, 9 and 10.

A reinforcing shoulder 46 is provided in the casting on the outer side of the wing 33 longitudinally from the end of the ear 27, as indicated in Fig. 7.

The casting just described thus comprises a terminal which may be supplied to the trade if desired, for making and assembling battery cables and the like, the ports affording inlet for liquid consolidating and sealing means such as melted lead or solder, and outlet for air to permit the melted substance to permeate among the strands and fill interstices in the socket.

The cable is protected by a spiral metal sheath or loom 48 having ribs 49 forming grooves. Cylindrically coiled wires 50 having a reduced cylindrical end portion 51 mounted on the cable adjacent the terminals and opposite end portions grip the sheath as by being engaged in the grooves of the sheath, and thus latched thereto, the ends 51 being contracted to securely grip the cable and bind the wires to the compressible insulation for anchoring the sheath at a central position on the cable.

The securing means or wires 50 are formed of loosely coiled spring wire and have their cylindrical portions of a diameter slightly less than the cable and sheath respectively so that they will exert a gripping pressure thereon.

In placing the gripping member and sheath on the cable the end portion 51 of one of these members is first compressed bringing the coils together, thereby increasing their diameter when the cable can be readily passed therethrough. Upon arriving at the proper position on the cable the pressure is released and the portion 51 tends to assume its normal length but this is prevented by reason of the portion being coiled to slightly smaller diameter than the cable and it will therefore grip the cable tightly and may even partially imbed itself in the insulation.

The sheath is now slipped over the cable and when its end reaches the enlarged portion of the gripping member these coils are compressed and the end inserted after which the coils are released and grip the sheath in the same manner as the portion 51 grips the cable. Another securing means is then placed on the cable and sheath in the same manner, and any attempt to move the sheath longitudinally of the cable will tend to elongate one of the securing means and thereby cause its coils to constrict thereby gripping the sheath and cable more tightly and prevent independent longitudinal movement thereof, it being understood of course that due to the elasticity of the securing means a very slight movement of the cable and sheath relative to each other cannot be prevented, but this movement is so slight as to be negligible.

The improved method for making and assembling parts of a cable and producing a finished commercial article employs steps now to be described. Usual casting and stamping processes may be employed to produce the terminals, the material used being highly conductive metal, to provide the novel articles illustrated in Figs. 2, 8 and 10.

One end of the cable is stripped of insulation to provide a bare end having substantially the length of the tubular portion of the terminal 18, Fig. 2, exclusive of the collar 23 thereof. The end of the cable is inserted in the socket, the insulation abutting the shoulder produced by the enlarged collar. Tongue-like ribs 21 and 22 are indented to press against and into the bundle of cable strands, any suitable means of instriking the tongues being employed, for example, a punch press.

The tongues bind the strands, and form a constricted throat to retain the head-like end portion in the socket. The pressure produced by pressing the tongues inwardly urges the strands against the inner surfaces of the sockets and particularly urges the tips of the strands against the end wall of the socket as best shown in Fig. 4.

The terminal, thus mounted on and secured to the cable, is then dipped in molten metal such as solder, having a low index of electrical conductivity, the solder flowing into the socket through one of the openings 21ª while air departs from the other opening, thus consolidating the strands and terminal, and sealing the terminal against entrance of substances that might result in corrosion or similar depreciation.

The step of producing the lug-like instruck tongues also preferably includes inpressing of the tubular body at points opposite the tongues, as indicated at 22 in Fig. 1, to enhance the binding effect.

The opposite end of the cable, also stripped, is laid in the open-sided socket upon the curved concave rib 38 and pressed down between the opposed ribs 36 and 37. The ends of the strands are pressed against the end wall 32, and the strands are passed down over the spike-like pin 43, the tapering character of which tends to urge the sides of the cable against the wings.

The wings are then bent toward each other and into engagement with the convex edge of the end wall 32, to complete the tubular form of the socket, the ends of the ribs 36 and 37 being brought into abutment, and the edges of the wings also being brought into abutment. The terminal is adapted to the diameter of the cable, and thus the wings will press against the bundle of strands, and tightly bind the cable. The ribs will press into the cable to form a constricted neck, as shown in Figs. 7 and 9, and press the outer end portion of the cable tightly into the socket and against the socket bottom 31 and end wall 32. The notches 40 are also brought into registry to produce the part 43ª.

The pressure of the wings bent for closing the socket further binds the cable strands to the pin 43.

The terminal is then dipped in molten material, preferably a non-corrosive metal such as lead having a sufficiently high melting point to prevent melting under use. The molten metal flows into the socket through one or both of the ports, air escaping through one of the ports.

The molten metal not only seals the openings, but covers all points and the surfaces of the terminals to provide a non-corrosive insulation to protect the cable, and provide a smooth outer surface covering the joints as indicated in Fig. 6. The metal further solidifies a mass of strands and forms a solid head latched in the terminal back of the neck formed by the ribs and tongues.

Each terminal is thus in effect made integral with the cable, to provide a permanently consolidated and unitary metal body including solid heads connected by the insulated flexible bundle of strands. The entire device is relatively immune to damage or deterioration ordinarily caused by substances having access to joints, and shocks, and highly efficient permanent conductive relation is established between the terminals and cable.

The possibility of resistance to current due to local contacts is thus eliminated, and the conductivity of a cable is greatly enhanced.

The enlarged open end portions of the sockets snugly engage the cable cover and the loom is latched to the cable, to further assure retention of all elements in properly assembled relation, protect the cable and cable strands from damage due to attrition and like hazards, and prevent disassembly of the elements.

If desired, the securing means may be made of relatively soft wire spirally coiled as previously described, but in this case the reduced cylindrical portion will be of such a diameter that the cable will readily pass therethrough and when the securing means is at its proper location on the cable this reduced portion is compressed by a press or any other tool designed for that purpose, so that the coils are partially embedded in the insulation, the large cylindrical portions of the member receiving one end of the sheath.

When a sheath of fiber known as loom is used, only one securing means need be used, since the sheath being of insulating material can be long enough to abut one of the terminals, but if a metallic sheath is used, two securing means are necessary in order to prevent a short circuit or to prevent the sheath from becoming electrified.

From the foregoing it will be seen that on account of the securing member being partially embedded in the cable insulation and being of round wire, it will not be affected by vibration and neither wear nor cut through the insulation and will therefore last the life of the cable.

What I claim and desire to secure by Letters Patent is:

1. In a cable of the character described including a stranded conductor, a connector for the cable including a sleeve portion extending over the ends of the strands, means in the sleeve portion directly engaging and compressing the strands into substantial solidity with each other and to effect spreading of their free ends within the sleeve portion, and a conductive material filling the spaces between the spread strands to form a head on the conductor ahead of said engaging and compressing means to prevent pulling of the cable from the connector.

2. In a cable of the character described including a stranded conductor, a connector for the cable including a sleeve portion extending over the end of the conductor, means in the sleeve portion directly engaging and compressing the strands into substantial solidity with each other and to effect spreading of their free ends within the sleeve portion, a member in the sleeve portion extending between the strands to extend conductivity to the inner strands of the conductor and to wedge the ends of the strands into electrical contact with the inner portion of the sleeve, and a conductive material filling the spaces between the spread strands to form a head on the conductor within said sleeve portion to prevent pulling of the cable from the connector.

3. In a cable of the character described including a stranded conductor having an insulating cover spaced from its end to expose the strands, a connector for the cable including a sleeve portion extending over the exposed portion of the strands and snugly embracing the end of the insulating cover, means in the sleeve portion directly engaging and compressing the exposed strands at a point adjacent the end of the cover to bring the strands into substantial solidity with each other and to effect spreading of their free ends within the sleeve portion, and a conductive material filling the spaces between the spread strands to form a head on the conductor to prevent pulling of the cable from the connector.

4. In a cable of the character described including a stranded conductor having an insulating cover spaced from its end to expose the strands, a connector for the cable including a sleeve portion extending over the exposed portion of the strands and snugly embracing the end of the cover, means in the sleeve portion directly engaging and compressing the exposed strands at a point adjacent the end of the cover to bring the strands into substantial solidity with each other and to effect spreading of their free ends within the sleeve portion, a wedge member in the sleeve for supplementing the spreading of the ends of the strands to force said ends into electrical contact with the interior wall of the sleeve portion, and a conductive material filling the spaces between the spread strands to form a head on the conductor to prevent pulling of the cable from the connector.

5. In a cable of the character described including a stranded conductor having an insulating cover spaced from its end to expose the strands, a connector for the cable including a sleeve portion extending over the exposed portion of the strands and snugly embracing the end of the insulating cover, a circumferential rib in the sleeve portion directly engaging and compressing the exposed ends of the strands and abutting against the end of the cover to bring the strands into substantial solidity with each other and to effect spreading of their free ends within the sleeve portion, a wedge-shaped pin member in the sleeve portion extending between the spread ends of the strands to extend electrical conductivity from the connector to the inner strands and to supplement spreading of the strands, and a conductive material filling the spaces between the spread strands to form a head on the conductor to prevent pulling the cable from the connector.

6. In a cable of the character described including a stranded conductor having an insulating cover spaced from its end to expose the strands, a connector for the cable including a sleeve portion extending over the exposed portion of the strands and snugly embracing the end of the insulating cover, a circumferential rib in the sleeve portion directly engaging and compressing the exposed ends of the strands and abutting against the end of the cover to bring the strands into substantial solidity with each other and to effect spreading of their free ends within the sleeve portion, and a wedge-shaped member in the sleeve portion extending between the spread ends of the strands to extend electrical conductivity from the connector to the inner strands and to supplement spreading of the strands.

7. In a cable of the character described including a stranded conductor having an insulating cover spaced from its end to expose the strands, a connector for the cable including a sleeve portion extending over the exposed portion of the strands and snugly embracing the end of the insulating cover and having inwardly pressed portions engaging the strands to spread the strands within said sleeve portion, and inwardly struck tongues on the connector for engaging the sides of the strands adjacent said depressed portions.

8. In a cable of the character described including a stranded conductor having an insulating cover spaced from its end to expose the strands, a connector for the cable including a battery post clamping portion, and a sleeve portion extending from the clamping portion for receiving the exposed strands and to extend over the end of the insulating cover, means in the sleeve portion directly engaging and compressing the exposed strands at a point adjacent the end of the cover to effect spreading of the free ends of the strands, and a conductive material filling the spaces between the spread strands to form a head on the conductor to prevent pulling of the cable from the connector.

9. In a cable of the character described including a stranded conductor having an insulating cover spaced from its end to expose the strands, a connector for the cable including a sleeve portion extending over the exposed portion of the strands and snugly embracing the end of the insulating cover to effect sealing of the open end of the sleeve, means in the sleeve portion directly engaging and compressing the exposed strands at a point adjacent the end of the insulating cover to bring the strands into substantial solidity with each other and to effect spreading of their free ends within the sleeve portion, and means for sealing the ends of the spread strands from the action of acid fumes exteriorly of the connector.

10. In a cable of the character described including a stranded conductor, a connector for the cable including a sleeve portion extending over the end of the conductor and having openings located in its opposite sides, means in the sleeve portion directly engaging and compressing the strands into substantial solidity with each other and to effect spreading of their free ends within the sleeve portion, and a conductive sealing material flowed through said openings to seal the spaces between the spread strands and to close said openings to prevent acid fumes from coming into contact with the strands of the cable.

11. In a cable of the character described including a stranded conductor having an insulating covering spaced from its ends to expose the strands, a connector for the cable including a sleeved portion extending over the exposed portions of the strands and snugly embracing the end of the covering, said sleeve including internal constricting means for compressing the strands into substantial solidity adjacent the end of the covering and having an internal shoulder abutting against the end of the covering to seal the exposed ends of the strands from external corrosive action, and a conductive material securing the strands to said conductor and sealed from contact with the covering by said compressing means and the compressed condition of the strands whereby the conductive material when applied in molten condition is prevented from injuring said covering.

JOHN TAYLOR.